(12) United States Patent
Gradert et al.

(10) Patent No.: US 6,662,908 B2
(45) Date of Patent: Dec. 16, 2003

(54) FORCE APPLICATION DEVICE FOR DISK BRAKES

(75) Inventors: Detlef Gradert, Nienhagen (DE); Hartmut Binder, Hannover (DE)

(73) Assignee: Wabco GmbH & Co. OHG, Hannover (DE)

( * ) Notice: Subject to any disclaimer, the term of this patent is extended or adjusted under 35 U.S.C. 154(b) by 0 days.

(21) Appl. No.: 10/219,407

(22) Filed: Aug. 15, 2002

(65) Prior Publication Data

US 2003/0034212 A1 Feb. 20, 2003

(30) Foreign Application Priority Data

Aug. 16, 2001 (DE) .......................................... 101 40 076

(51) Int. Cl.$^7$ ............................................. F16D 65/56
(52) U.S. Cl. ..................................... 188/72.9; 188/72.8
(58) Field of Search ........................... 188/72.7, 72.8, 188/72.9, 167

(56) References Cited

U.S. PATENT DOCUMENTS 5,501,305 A * 3/1996 Stalmeir et al. ............ 188/167
5,788,024 A * 8/1998 Meyer ....................... 188/72.7

FOREIGN PATENT DOCUMENTS

| DE | 198-51-668 A1 | 5/2000 |
| DE | 199-45-702 A1 | 4/2001 |
| EP | 06-44-358 B1 | 3/1995 |

* cited by examiner

Primary Examiner—Christopher P. Schwartz
(74) Attorney, Agent, or Firm—Kramer Levin Naftalis & Frankel LLP

(57) ABSTRACT

A force application device for a vehicle's braking system in the form of a variable gear system, in which, in response to a braking command by the driver, an adjusting device adjusts a proportioning device, which proportions the force fed from the force generator in such a way that it corresponds to the braking command. The force generator is disposed in a fixed position, thus decreasing the overall size of the force application device. In the force application device, energy recovery of the elastic energy of deformation contained in the disk brake during force application conditions is achieved by feeding the energy back, during release of the brake, into a force generator, which is constructed as a spring brake actuator and which makes the energy available for brake actuation. Thus the principle of an energy see-saw is implemented.

30 Claims, 4 Drawing Sheets

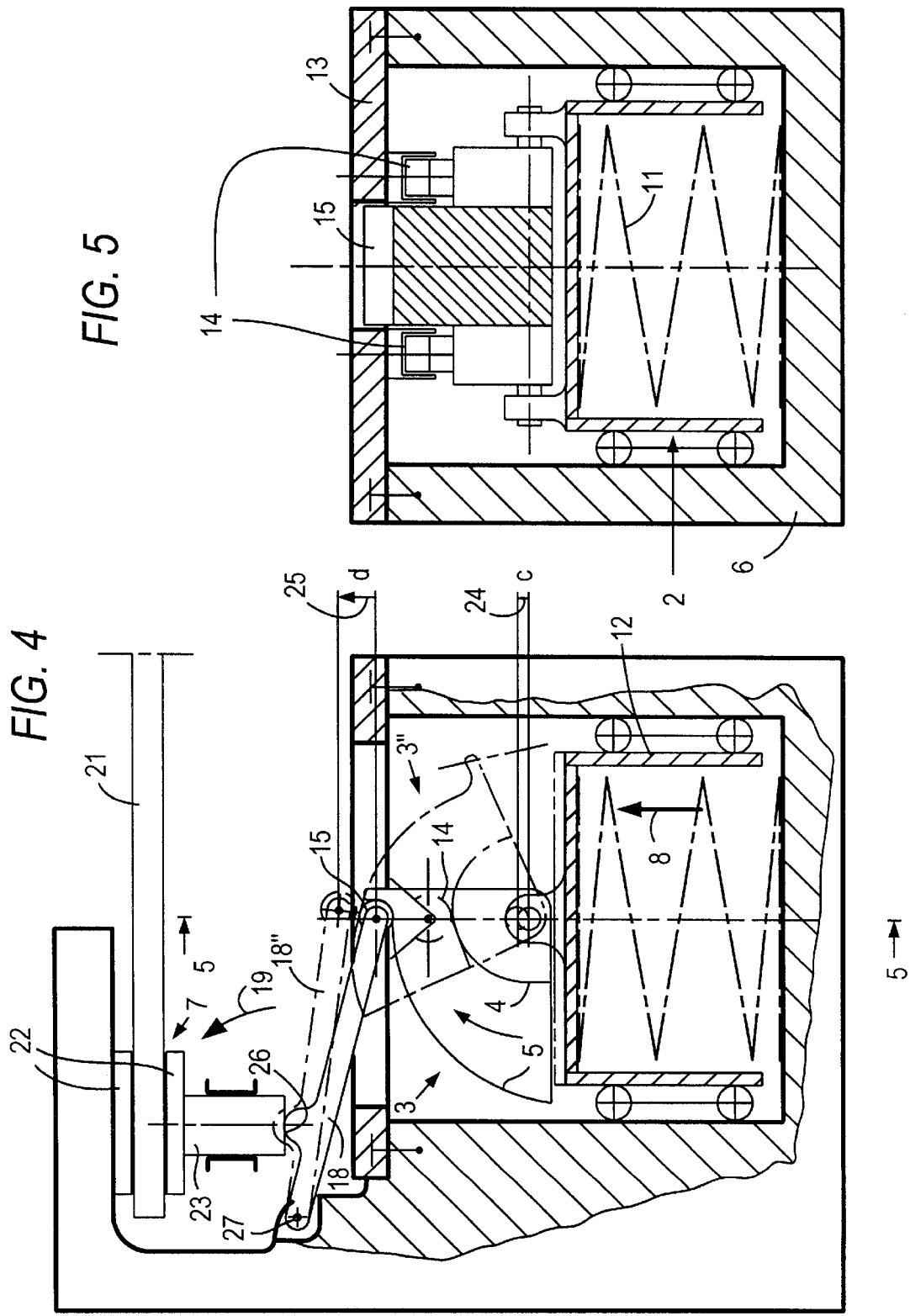

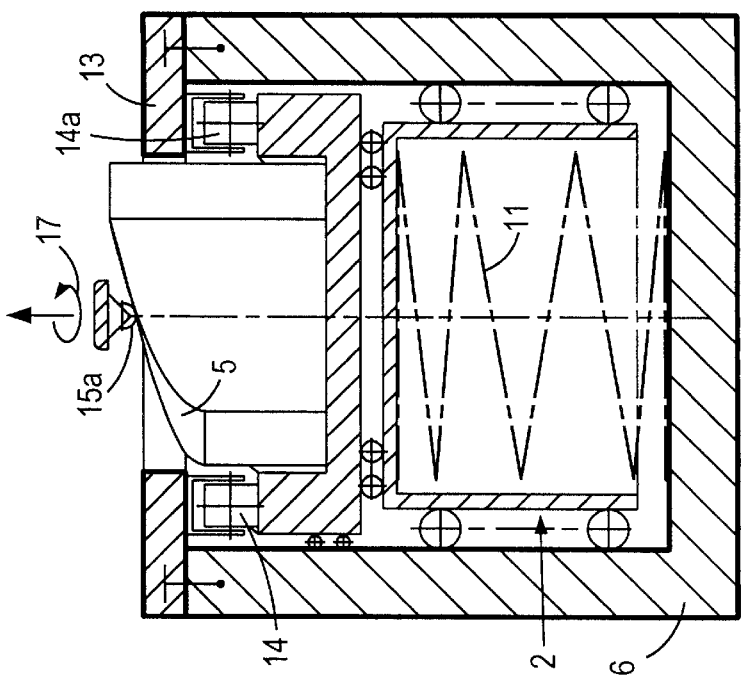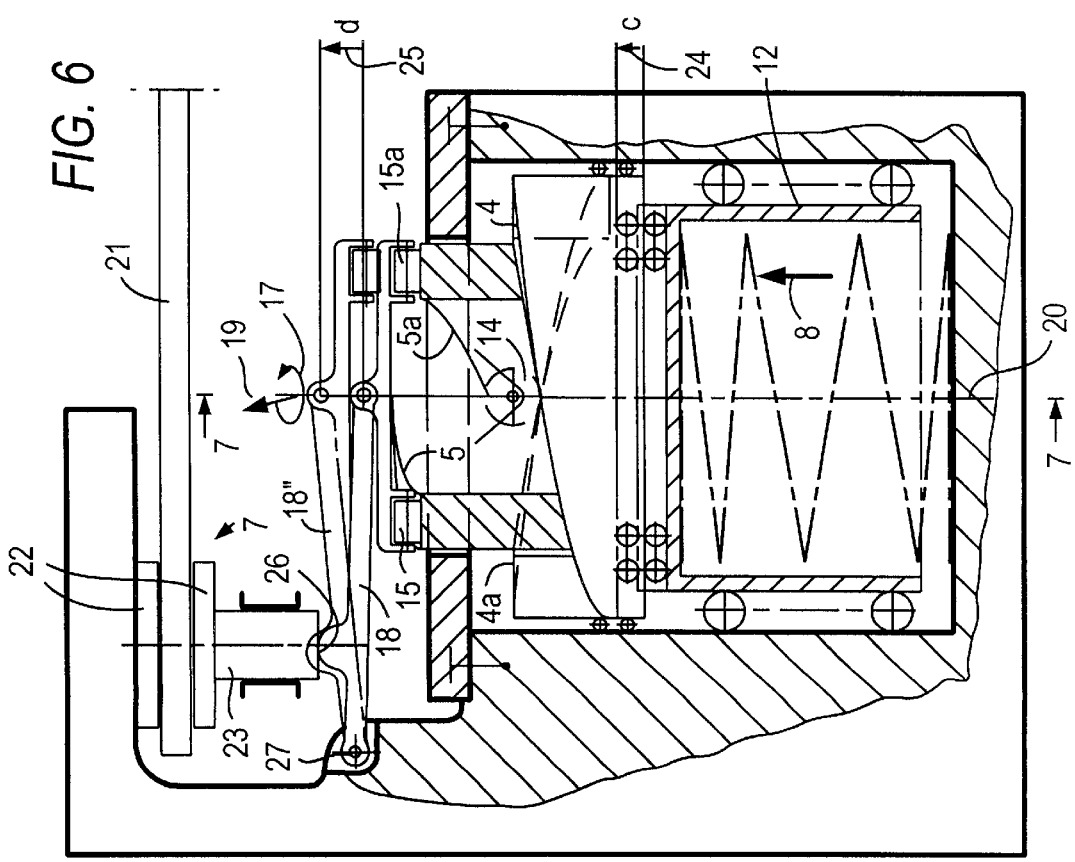

FORCE APPLICATION DEVICE FOR DISK BRAKES

BACKGROUND OF THE INVENTION

The present invention generally relates to a force application device for disk brakes.

Such force application devices are known in the art, see for example, European Patent EP 0 644 358 B1. In the cited patent, for the case of a disk brake having a braking force applied thereto, the brake linings and the housing, which for example may be constructed as a floating caliper, are elastically deformed in order to achieve force application. The linings and housing therefore form a force-absorbing system, which stores the elastic deformation energy of these two parts.

In the known force application device, as disclosed in the cited patent, energy for application of the disk brake is transmitted to the force-absorbing system using a force generator constructed as a spring brake actuator and referred to as a force cartridge. A lever equipped with a lever bearing, which is disposed in a fixed position relative to the force-absorbing system, is provided for energy transmission. This lever has two points of force application, a first point of force application with predetermined lever length, which acts on the force-absorbing system, and a second point of force application at a variable position of the lever arm for action on the force cartridge. To permit variation of the second point of force application, the force cartridge is mounted pivotally around a fulcrum, and an adjusting device for selecting the desired position of the second point of force application is provided.

In the known force application device, during reversal of the working travel, corresponding to release of the brake, a portion of the elastic deformation energy contained in the force-absorbing system is recovered and fed into the energy-storing force generator, thus increasing the energy in the force generator by the amount of the recovered deformation energy. With this principle of energy recovery, an alternating transfer of stored energy takes place from the force generator to the force-absorbing system on the one hand and from the force-absorbing system to the force generator on the other hand. Accordingly, energy efficiency is achieved in the known device.

However, the known force application device suffers from the disadvantage that the structural configuration of a lever with a fixed lever bearing, the lever-arm length necessary for adjustment, and the pivotally mounted force generator with the adjusting device necessary for swiveling require a relatively large installation space. Where the space available for the braking assembly is limited, as is the case in disk brakes for motor vehicles, it is difficult to use the known force application device given its greater space requirements.

Accordingly, it is desired to provide an improved force application device of the type mentioned in the introduction, that overcomes the shortcomings associated with the prior art, such as, for example, providing a device that occupies a smaller space than the known devices, while retaining the benefits of energy recovery.

SUMMARY OF THE INVENTION

Generally speaking, a force application device is provided that retains the energy recovery benefits of known force application devices, while obviating the space requirement shortcomings in the prior art.

In a first aspect of the present invention, a force application apparatus is provided for applying a braking force to a force-absorbing system of a disk brake including a force generating device for applying a variable force to the force-absorbing system, a proportioning device having at least two contoured surfaces, a lever pivotally coupled to the force application apparatus cooperating with at least one of the at least two contoured surfaces to deliver the varying force applied to the force-absorbing system, and an adjusting device for changing the position of the at least one contoured surface with respect to the lever to vary the force delivered to the force-absorbing system.

In another aspect of the present invention, the at least two contoured surfaces are constructed such that when the position of the adjusting device is adjusted to increase the force acting on the force-absorbing system, energy is liberated from the force generating device and when the position of the adjusting device is adjusted to decrease the force acting on the force-absorbing system, the force generating device absorbs at least part of the energy released by the force-absorbing system.

In a further aspect of the present invention, the at least two contoured surfaces comprise a first and a second cam plate as a unitary block disposed between the lever and the force generating device.

In another aspect of the present invention, the force generating device includes a precompressed spring at least partially disposed within a spring housing and wherein the spring housing cooperates with the proportioning device and lever to deliver the varying force applied to the force-absorbing system.

Accordingly, an object of the present invention is to provide a force application device that retains the energy recovery benefits of known force application devices, while obviating the space requirement shortcomings in the prior art.

Another object of the present invention is to provide a force application device that delivers a varying force to the force-absorbing system of a vehicle's braking system using a force generating device and proportioning device.

Yet another object of the present invention is to provide the proportioning device with at least two contoured surfaces that are constructed such that when the position of the adjusting device is adjusted to increase the force acting on the force-absorbing system, energy is liberated from the force generating device and when the position of the adjusting device is adjusted to decrease the force acting on the force-absorbing system, the force generating device absorbs at least part of the energy released by the force-absorbing system, thereby establishing energy see-saw behavior.

Still other objects and advantages of the present invention will in part be obvious and will in part be apparent from the specification.

The present invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which:

FIG. 4 illustrates, in schematic diagram form, the force application device using a proportioning device with two cam plates that are rotationally adjusted according to the swiveling cam principle;

FIG. 5 illustrates a cross-sectional view of the force application device of FIG. 4 taken along the line 5—5;

FIG. 6 illustrates, in schematic diagram form, the force application device using a proportioning device with two cam plates that are rotationally adjusted according to the rotating cam principle; and FIG. 7 illustrates a cross-sectional view of the force application device of FIG. 6 taken along the line 7—7.

DETAILED DESCRIPTION OF THE PREFERRED EMBODIMENTS

Figure 1:
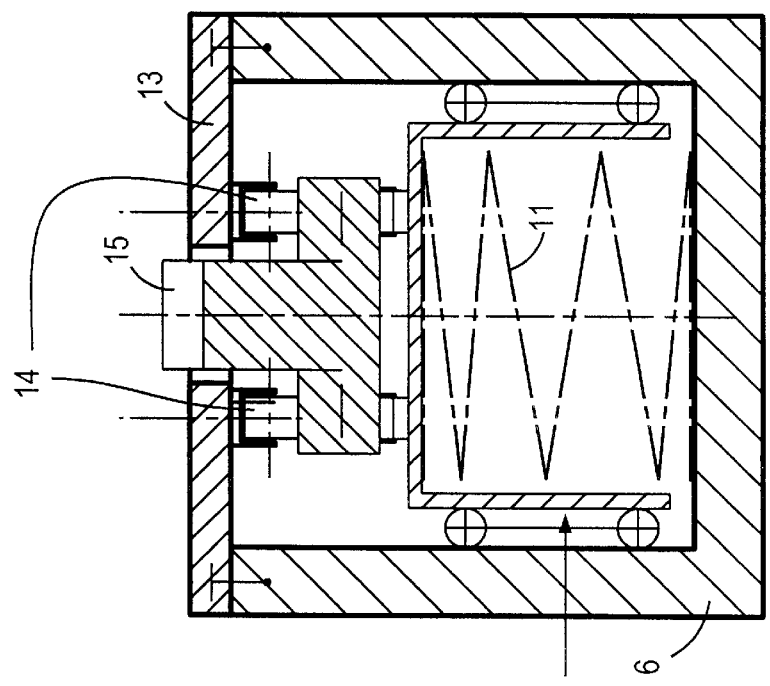
FIG. 1 illustrates, in schematic diagram form, the force application device using a proportioning device with two cam plates that are translationally adjusted.

Reference is made to the drawing figures where identical reference symbols are used when possible for like parts, and so the explanation of a part in one drawing also serves as the description for that part in other drawings. Where alternative versions, such as configurations for the production of a parking brake, are described in the embodiment of one drawing, these versions are also applicable in the embodiments of the other drawings and are not repeatedly explained.

Like the lever arrangement disclosed in the previously cited patent, the inventive solution of the present invention also applies to a mechanical gear system with a variable transmission ratio. But unlike the known force application device, the inventive device can be fitted into a smaller installation space than is required in the device disclosed in the cited patent.

In a further embodiment of the present invention, the force generator of the inventive force application device is fixed in position. This has the advantage of obviating the detrimental inertial force created by the swiveling of the force generator in the known force application device, which possesses considerable mass because of the heavy springs. This detrimental inertial force acts at the center of gravity of the force generator and can lead, for example, to dynamic problems during brake application. In contrast, in the case of a fixed arrangement of the spring brake actuator (i.e. force generator), this considerable inertial force is not present. Inertial forces are developed only by the adjustment of the proportioning device cam plates (as discussed hereinafter), but are greatly reduced because of the considerably smaller mass of the cam plates.

Figure 2:
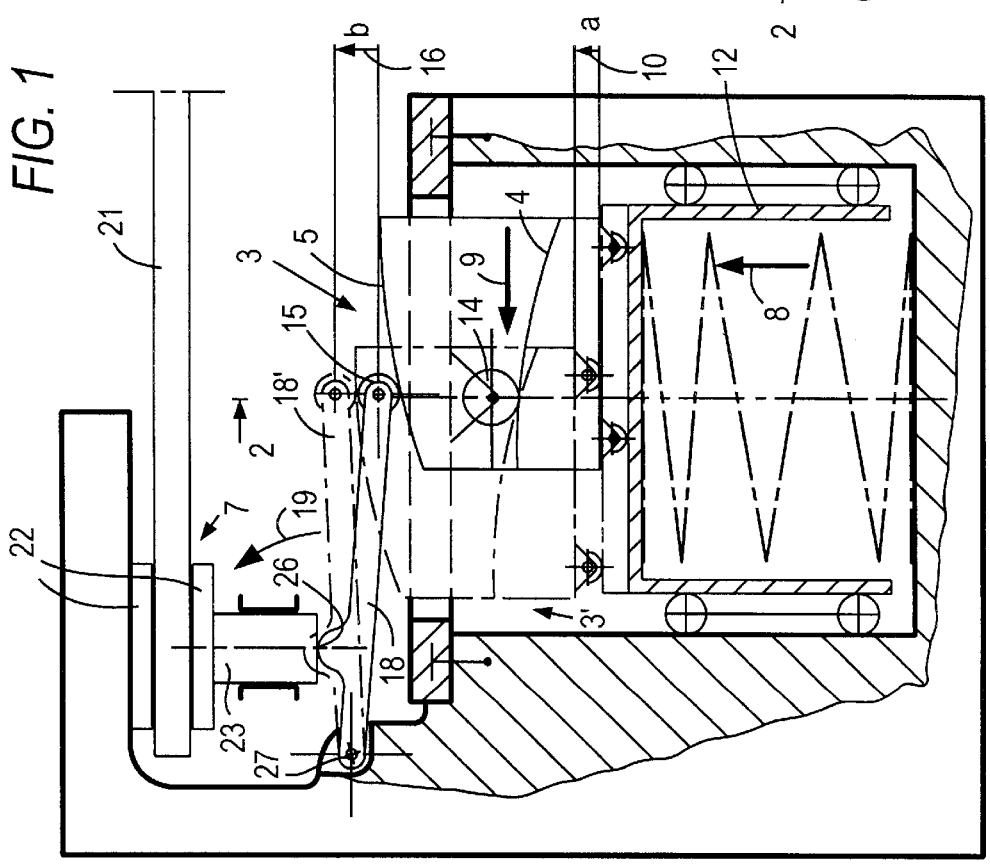
FIG. 2 illustrates a cross-sectional view of the force application device of FIG. 1 taken along the line 2—2.

Referring to FIGS. 1 and 2, a mechanical unit is illustrated in two sectional planes. The elements of the mechanical unit include an energy storing force generator 2 constructed as a spring brake actuator and comprising a precompressed pressure spring 11 and a spring housing 12, which can be displaced in the vertical direction 8 along a laterally disposed roller bearing (not shown) positioned between a side wall of the spring housing 12 and a side wall of housing 6. The mechanical unit also includes a one piece proportioning device 3, which is constructed in the form of a slide block that can be displaced translationally on roller bearings to apply a varying force under the action of force generator 2. The slide block is capable of being displaced in horizontal direction 9 over the top face of the spring housing 12 by an adjusting device, which for reasons of clarity is not illustrated. The proportioning device 3 is equipped with the first and second cam plates 4 and 5, which are rigidly coupled with one another, with the first cam plate 4 cooperating with housing 6 through force transmission, which force results from the upward pressure exerted by the compressed spring 11 of the force generator 2. A force-absorbing system 7 is also provided, which is constructed as a disk-brake arrangement, with a brake disk 21, brake linings 22 and a pressure bar 23, which cooperates with the second cam plate 5 through force transmission via brake lever 18.

In response to a braking command by the driver, the proportioning device (slide block) 3 is pushed by the adjusting device in horizontal direction 9 along the axis of displacement of the adjusting device. The roller bearing is configured such that the proportioning device (slide block) 3 is confined in all other directions of movement relative to the top face of the spring housing 12. Thus, the proportioning device (slide block) 3 has only one degree of freedom.

As further shown in FIGS. 1 and 2, the first and second rollers 14 and 15 are provided to minimize friction during the aforesaid cooperation, through force transmission, of the cam plates 4 and 5 with the housing 6 and the force-absorbing system 7, respectively.

To prevent a torque from acting on the proportioning device (slide block) 3 and possibly causing jamming, as well as impairment of smooth running, especially under the large force of the force generator 2, the first roller 14 is constructed as a double roller. Within the meaning of its logical principle of functioning as bracing means (discussed hereinafter), a matching pair of rollers is also described here as "one roller."

The first roller 14 is mounted in a fixed position in the housing 6 (housing cover 13 of the actual bearing location for the first roller 14 cooperates interlockingly with housing 6) and during horizontal displacement of the proportioning device (slide block) 3, rolls down along the surface track of the first cam plate 4. During such a displacement, the travel of the pressure spring 11 changes; this spring travel is determined by the point of the surface track of the first cam plate 4 at which the first roller 14 is braced.

The maximum travel of the pressure spring 11 is determined by the height difference along the surface track of the first cam plate 4 as measured between the initial position (zero displacement) and the maximum position (maximum displacement) of the proportioning-device (slide block) 3.

In FIG. 1, the proportioning device (slide block) 3 is illustrated in its initial position (to the right) with lines having normal thickness. The proportioning device (slide block) 3 is also shown, in phantom view, in its maximum position 3'. Thus the maximum travel of pressure spring 11 is equal to distance "a" (the vertical displacement of the lower edge of the proportioning device (slide block) 3 from the initial position to the maximum position), which is designated by reference numeral 10 in FIG. 1.

Thus, the travel of the pressure spring 11 varies with the graduated horizontal displacement of the proportioning device (slide block) 3, and the slide block 3 executes a lifting movement synchronized with the pressure spring 11, thus actuating the brake lever 18. Upon actuation of the brake lever 18, disk brake 21, 22 is applied via the brake cam 26 and the pressure bar 23.

In particular, during the displacement and lifting movement of the proportioning device (slide block) 3, the second roller 15, which is mounted on brake lever 18, rolls down along the contoured surface track of the second cam plate 5. In a manner analogous with the foregoing descriptions, distance "b", which is designated by reference numeral 16, is the maximum vertical displacement of the brake lever from the initial position 18 to the maximum position 18' relative to the center of the second roller 15.

As explained, the spring travel of the force generator 2 is used to generate the actuating force for the disk brake, wherein the force generator 2 acts with variable force in a particular direction (vertical direction 8 in FIG. 1) as effected by the proportioning device 3, which in turn is displaced by an adjusting device.

The described process is reversible. The force-absorbing system 7 formed by the disk brake develops an opposing force, which varies as a function of the spring travel, which predominately depends on elastic deformation of the brake linings and further force applying elements, such as brake lever 18, and which therefore increases or decreases, in a substantially linear manner with the actuating travel of spring 11.

During an increase of the force acting on the force-absorbing system 7 caused by the proportioning device 3 acted upon by the adjusting device, the force generator 2 liberates part of the energy stored within it (an increase of the travel of pressure spring 11 leads to energy liberation), and during a decrease of the force acting on the force-absorbing system 7 caused by the proportioning device 3 acted upon by the adjusting device, the pressure spring 11 again absorbs at least part of the absorbed energy released by the force-absorbing system 7 (decrease of the travel of the pressure spring (i.e., compression) leads to energy absorption by the force generator 2).

To achieve this recovery of the energy of elasticity stored in the force-absorbing system 7, the contours of the first and second cam plates 4 and 5 are ingeniously designed to match one another, thus implementing the principle of the energy see-saw.

International Patent Application WO 01/44677 A1 discloses principles according to which equations for such energy-optimized contours can be formulated and solved in order to achieve energy-optimized application, or in other words, functional energy see-saw behavior. The prerequisite for such a design is the absence of friction. Naturally, in practice, this can only be achieved to an approximate degree when the friction is sufficiently low. In the present case, parabolic contours are used for the first and second cam plates 4 and 5.

The adjusting device for the proportioning device (slide block) 3 can be produced in diverse ways. For example, it is possible to employ a toothed-rack drive, in which a toothed rack, moved translationally by a motor-driven toothed gear, is mounted on the lower boundary face of the proportioning device (slide block) 3 (above the rollers).

Figure 3:
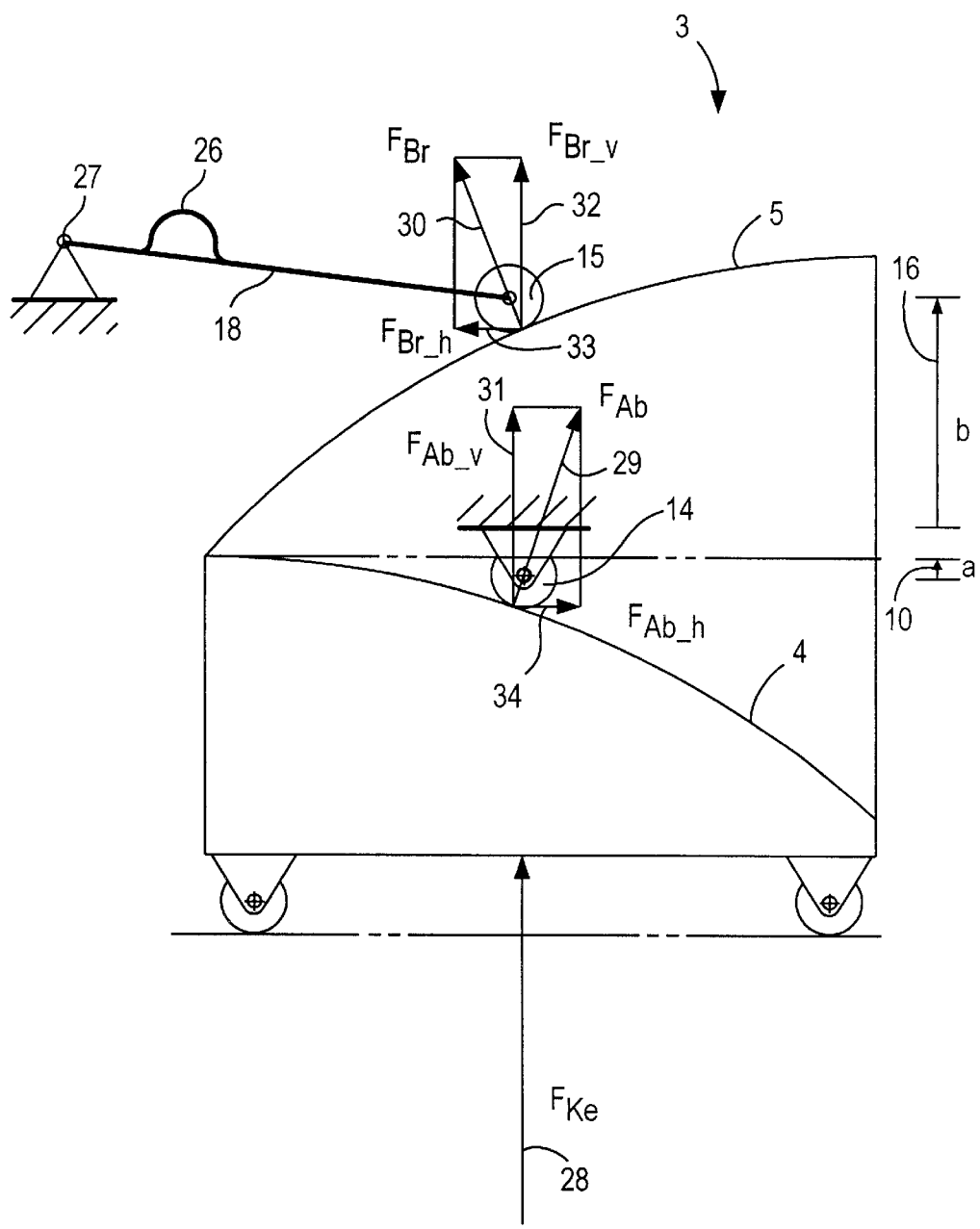
FIG. 3 illustrates, in schematic diagram form, the forces acting on the force application device of FIG. 1.

In the diagram of forces according to FIG. 3, the force vectors acting on the proportioning device (slide block) 3 according to FIGS. 1 and 2 are shown for the case of energy-optimized contours of the first and second cam plates 4 and 5. Force vector $F_{Ke}$ 28, acting in the vertical direction on the proportioning device (slide block) 3, is resolved into two force vectors, a bracing force vector $F_{Ab}$ 29 acting on the housing 6 and force vector $F_{Br}$ 30 acting on brake lever 18.

The direction of bracing force vector $F_{Ab}$ 29 passing through the roller center of the first roller 14, is given by the tangent to the contour of the first cam plate 4 at the point of contact with the roller. Similarly, the direction of braking force vector $F_{Br}$ 30 passing through the roller center of the second roller 15, is given by the tangent to the second cam plate 5 at the point of contact with the roller. The sum of the vertical force components $F_{Br-v}$ 32 and $F_{Ab-v}$ 31 is equal to force vector $F_{Ke}$ 28.

In the energy-optimized condition, the proportioning device (slide block) 3 must be capable of being displaced without force from one position to another. This forceless displacement is possible when, for each position of the proportioning device (slide block) 3, the horizontal force components $F_{Ab-h}$ 34 and $F_{Br-h}$ 33 cancel one another out. This condition can be used as an alternative to the previously described calculation for determining the energy-optimized contours of the first and second cam plates 4 and 5.

In an alternative embodiment of the force application device illustrated in FIGS. 4 and 5, the force generator 2 and the force-absorbing system 7 are identical to the constructions depicted in FIGS. 1 and 2. However, in the proportioning device 3 the first and second cam plates 4 and 5, which are rigidly coupled with one another, are adjusted by rotation in a swiveling motion, instead of by translation. The proportioning device is constructed as a proportioning device (swiveling cam) 3.

The cooperation of the cam plates 4 and 5 through force transmission via the first and second rollers 14 and 15, corresponds to the embodiment described with reference to FIGS. 1 and 2, as does the functional principle previously described, wherein the travel of pressure spring 11 is increased with an adjustment of the proportioning device (i.e., the swiveling of the proportioning device 3 in FIGS. 4 and 5) such the cam and the pressure spring 11 execute a synchronous motion that leads to actuation of the brake lever 18.

The swiveling of the proportioning device (swiveling cam) 3 takes place in the clockwise direction 17 between the initial position of 0° and the maximum position of 90°. In FIG. 4, the proportioning device (swiveling cam) 3 is shown in the initial position with lines drawn in normal thickness and depicted in phantom lines 3" at a swiveling angle of about ⅔ of the maximum position. For reasons of clarity, the proportioning device (swiveling cam) 3 is not depicted at the maximum position, as the lines would coincide in a manner that impairs understanding of the function. In the position 3", the center-line of the proportioning device (swiveling cam) 3 has been displaced by a distance "c", which is designated by the reference numerical 24, in vertical direction 8 due to the travel of pressure spring 11, leading to a vertical displacement of the brake lever 18 by distance "d", which is designated by the reference numeral 25, relative to the initial position.

The contour of the first cam plate 4 is not that of a circular arc, instead it has a special form provided with a descending gradient toward the maximum position. Thus, if no force were acting on the second cam plate 5 (corresponding to an absence of the brake lever 18 with the second roller 15), the proportioning device (swiveling cam) 3 would be swiveled into maximum position by the action of the force generator 2.

The contour of the second cam plate 5 is also not that of a circular arc, instead it has a special form provided with a descending gradient toward the initial position. If only the brake lever 18 with the second roller 15 was to act on the proportioning device 3 (corresponding to the absence of pressure spring 11, so that no force acts on the first cam plate 4, the proportioning device (swiveling cam) 3 would be swiveled back to its initial position by the action of the second cam plate 5.

Thus the force-absorbing system 7 exerts a counterclockwise torque on the proportioning device (swiveling cam) 3, whereas the force generator 2 exerts a clockwise torque on the proportioning device (swiveling cam) 3.

As in the embodiment according to FIGS. 1 and 2, the principle of the energy see-saw can be implemented by appropriate design of the contours of the first and second cam plates 4 and 5. To this end, the contours for the cam plates 4 and 5 must be designed such that the resulting torque around the swiveling-axis centerline 20 is zero for every swiveling angle of the proportioning device (swiveling cam) 3 to achieve an ideal energy see-saw, meaning that energy is transferred from the force generator 2 into the force-absorbing system 7 and vice versa without loss.

As an alternative to determining the energy-optimized contours for the first and second cam plates 4 and 5 according to the equilibrium of moments, the curves can also be determined, as previously indicated in the explanation accompanying FIGS. 1 and 2, by solving mathematical equations formulated according to energy-optimized conditions.

With regards to the practical design of the proportioning device (swiveling cam) 3, various parameters can positively influence the design, such as the radii at which the contours of the cam plates 4 and 5 are in contact with their respective rollers. While the rollers 14 and 15 are disposed vertically above swiveling-axis centerline 20 in FIGS. 4 and 5, it may also be advantageous to offset them slightly to the side, in order to advantageously influence the equilibrium of moments of the cam around centerline 20.

In determining the contour for the first cam plate 4, it may be advantageous to shape it such that the roller "floats in air" at the maximum position, in order to ensure that the entire force of the force generator 2 can be transferred with certainty into the brake linings 22 of the disk brake.

The function of a parking brake can be simply achieved by providing a depression into which the second roller 15 snaps at the maximum position in the contour of the second cam plate 5. The snap-in depression can also be provided on the first cam plate 4. Alternatively, the parking brake can also be achieved by employing a pin to fix the second cam plate 5 (or even the first cam plate 4) at maximum position relative to housing 6. Such a pin can be actuated, for example, by means of a lifting magnet. Such fixations can also be attached in the initial position and used advantageously for transportation and/or for securing the assembly.

Instead of basing the function of the parking brake on one of the two cam plates 4 or 5 (either by using a depression or a pin), it may be advantageous to provide a further cam plate for this purpose that can be swiveled synchronously with the cam plates 4 and 5. In such a solution, no changes of any kind need then be made to the two accurately designed, energy-optimized contours of the cam plates 4 and 5.

In the embodiment shown in FIGS. 4 and 5, force multiplication by the brake lever 18 takes place due to the ratio of the distance of the roller center of the second roller 15 from the brake-lever fulcrum 27 to the distance of the brake cam 26 from the brake-lever fulcrum 27. If such force intensification can be dispensed with in a given design, it will also be possible to activate the brake directly by the proportioning device 3. In this case, the brake lever 18 is omitted and the second roller 15 is pivotally mounted directly on the pressure bar 23.

In the previously described embodiment, hydraulic force transmission can be used in the place of mechanical force transmission. This is particularly advantageous when the inventive force application device is to be connected to an existing hydraulic wheel brake. The hydraulic brake cylinder of the wheel brake is connected via a hydraulic line to a hydraulic master cylinder, which cooperates in an interlocking manner with the housing 6, and to the piston to which the second roller 15 is pivotally fastened, so that, as illustrated in FIG. 4, the second roller 15 rolls down over the second cam plate 5 during brake actuation.

In general, this solution may be advantageous where, for space reasons, force generator 2 cannot be mounted directly at the wheel. Resetting of the brake can then be achieved by the modern oil-refilling technique, although "dry resetting" is always preferable.

When the proportioning device is constructed according to FIGS. 4 and 5, the adjusting device (not illustrated for reasons of clarity) swivels the proportioning device (swiveling cam) 3 via the swiveling-axis centerline 20. Accordingly, the adjusting device is constructed as a rotary device, whose axis of rotation is disposed perpendicular to the axis of the force generator 2 (referring to FIG. 3, force vector $F_{Ke}$ 28 acts on the proportioning device 3 along the central axis of the force generator 2).

The adjusting device for the embodiment according to FIGS. 4 and 5 is formed by an electric swivel motor, which has the form, for example, of a bevel-gear motor, in which a bevel wheel fastened on the motor engages an annular toothed-rack element fastened on the proportioning device (swiveling cam) 3. This adjusting motor is fastened in a fixed position on the top of the spring housing 12, and it accompanies the compression and decompression movements of the force generator 2, as do the cam plates 4 and 5.

In another alternative embodiment of the present invention illustrated in FIGS. 6 and 7, the proportioning device 3 is constructed according to the rotating-cam principle, wherein a circular plate having first and second cam-plate pairs 4, 4a and 5, 5a is disposed on the force generator 2 of the type previously described. Each cam plate covers an angular segment of 180°, such that the entire circular arc of 360° is covered by the respective matching cam plates 4, 4a, and 5, 5a.

Although the cam plates in this case are constructed as matching pairs, they correspond in their function to the single cam plates as explained in FIGS. 1 and 2 and FIGS. 4 and 5. As previously explained for the configuration of a roller as a double roller (roller pair), the paired configuration of a cam plate also is merely used to prevent torques that could lead to jamming of the device, especially with the large forces acting in such a applying device. Within this meaning, a matching pair of cam plates is also claimed as "one cam plate", in view of their logical functional principle.

Referring again to FIGS. 6 and 7, the first cam-plate pair 4, 4a is braced on a first roller pair 14, 14a, which is mounted in fixed relationship on the housing. For brake actuation, the proportioning device (rotating cam) 3 is swiveled by the adjusting device, which is not illustrated, in a clockwise direction 17 from 0° (initial position) to 180° (maximum position). In FIG. 6, the proportioning device (rotating cam) 3 is shown at a swiveling angle of 90° (half of the maximum actuation angle). During this rotation, the first roller pair 14, 14a rolls down over the surface tracks of the first cam-plate pair 4, 4a along their descending gradient and the travel of the pressure spring (11) is increased and the proportioning device (rotating cam) 3 is raised synchronously with this increase of travel corresponding to the "height loss". At the illustrated swiveling angle of 90°, this vertical displacement (spring decompression) corresponds to distance "c", which is designated by reference numeral 24.

During the described rotation of the proportioning device (rotating cam) 3, the second roller pair 15, 15a rolls down over the surfaces of the second cam-plate pair 5, 5a, whereupon an additional "height gain" is achieved due to the positive slope of this pair, and thus distance "d", which is designated by reference numeral 25, for actuation of brake lever 18 is additionally enlarged (increase of travel) compared with the spring travel "c", which is designated by reference numeral 24.

Whereas the angular segments of cam-plate pairs 4, 4a and 5, 5a are 180° in the example illustrated in FIGS. 6 and 7 (maximum resolution for the maximum possible application angle of rotation of 180°), smaller values can also be chosen. Any angular segment between 0° and 180° is possible for this purpose, although identical angular segments must be chosen for both cam-plate pairs 4, 4a and 5, 5a.

For the adjusting device, an electric motor (not shown) is provided, which is fastened on the spring housing 12 and which rotates the proportioning device (rotating cam) 3 relative to the force generator 2 via a gear system. The roller bearing of the force generator 2 is constructed such that it cannot rotate relative to the housing 6. This gear system can be equipped with chain wheels, spur gears, bevel gears or planetary gears, although other drive types may also be used.

When the proportioning device is constructed as the proportioning device (rotating cam) 3 according to FIGS. 6 and 7, the adjusting device constructed as a rotary device rotates this cam along an axis of rotation that is identical to the axis of the force generator 2. This rotationally symmetric construction of the proportioning device (rotating cam) 3 advantageously ensures that a tilting torque acting on the force generator 2 cannot develop at all. By comparison, in the embodiment according to FIGS. 1 and 2, such a tilting torque develops to a certain extent and, in the embodiment according to FIGS. 4 and 5, this tilting torque becomes zero in the energy-optimized version of the two cam plates.

Accordingly, the present invention provides an improved force application device that reduces the space requirement while retaining the energy efficiency benefits of known force application devices. In the inventive force application device, energy recovery of the elastic energy of deformation contained in the disk brake during force application conditions is achieved by feeding the energy back, during release of the brake, into a force generator, which is constructed as a spring brake actuator and which makes the energy available for brake actuation. Thus the principle of an energy see-saw is implemented.

The force application device is produced in the form of a variable gear system, in which, in response to a braking command by the driver, an adjusting device adjusts a proportioning device, which proportions the force fed from the force generator in such a way that it corresponds to the braking command. The force generator is disposed in a fixed position, thus decreasing the overall size of the force application device and permitting advantageous dynamic characteristics. Selection of force in the proportioning device is achieved by means of two cam plates, whose contours are configured such that they satisfy the conditions for functioning of the energy see-saw. The proportioning device is constructed as a slide block that can be displaced in translation, as a swiveling cam that can be displaced in rotation or as a rotating cam that can be displaced in rotation.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A force application device for disk brakes having a force-absorbing system with at least one elastically deformable component for absorbing and releasing energy comprising a force-generating device having stored energy for applying a variable force to the force-absorbing system, a proportioning device having at least two cam plates for varying the force acting on the force-absorbing system based on a position of the proportioning device, the at least one elastically deformable component of the force-absorbing system developing an opposing force that varies linearly as a function of the force applied by the force-generating device and, an adjusting device for adjusting the position of the proportioning device such that when the position of the adjusting device is adjusted to increase the force acting on the force-absorbing system, energy is liberated from the force-generating device and when the position of the adjusting device is adjusted to decrease the force acting on the force-absorbing system, the force generating device absorbs at least part of the energy released by the force-absorbing system.

2. The force application device according to claim 1, further comprising a housing containing at least a portion of the force-generating device and wherein a first cam plate of the at least two cam plates cooperates with the housing through force transmission, a second cam plate of the at least two cam plates cooperates with the force-absorbing system through force transmission and the first and second cam plates have different contour characteristics.

3. The force application device according to claim 2, wherein the adjusting device synchronously actuates the first and the second cam plates.

4. The force application device according to claim 2, wherein the proportioning device and the adjusting device are constructed as a translational device.

5. The force application device according to claim 1, wherein the proportioning device and the adjusting device are constructed as a rotational device.

6. The force application device according to claim 5, wherein the axis of rotation of the proportioning device is disposed parallel to the axis of the force-generating device.

7. The force application device according to claim 5, wherein the axis of rotation of the proportioning device is disposed perpendicular to the axis of the force-generating device.

8. The force application device according to claim 1, wherein the force-generating device is disposed in fixed position relative to the force-absorbing system.

9. The force application device according to claim 1, wherein a first cam plate of the at least two cam plates of the proportioning device is adapted to have a first contour for liberation of energy from the force-generating device and a second cam plate of the at least two cam plates of the proportioning device is adapted to have a second contour for absorption of energy by the force-absorbing system such that, during an increase of the force acting on the force-absorbing system, the magnitude of the energy liberated by the force-generating device is equal to the magnitude of the energy absorbed by the force-absorbing system, the signs of the energy contents liberated by the force-generating device and absorbed by the force-absorbing system being opposite.

10. The force application device according to claim 9, wherein the first contour is formed by a bracing face of the first cam plate and the second contour is formed by a bracing face of the second cam plate.

11. A force application device for disk brakes having a force-absorbing system with at least one elastically deformable component for absorbing and releasing energy comprising a force-generating device having stored energy for applying a variable force to the force-absorbing system, a proportioning device having at least two cam plates for varying the force acting on the force-absorbing system based on a position of the proportioning device, the at least two cam plates of the proportioning device being rigidly coupled together and disposed as a one-piece component between the force-generating device and the force-absorbing system, the at least one elastically deformable component of the force-absorbing system developing an opposing force that varies linearly as a function of the force applied by the force-generating device and, an adjusting device for adjusting the position of the proportioning device such that when the position of the adjusting device is adjusted to increase the force acting on the force-absorbing system, energy is liberated from the force-generating device and when the position of the adjusting device is adjusted to decrease the force acting on the force-absorbing system, the force generating device absorbs at least part of the energy released by the force-absorbing system.

12. The force application device according to claim 11, further comprising a housing containing at least a portion of the force-generating device and wherein a first cam plate of the at least two cam plates cooperates with the housing through force transmission, a second cam plate of the at least two cam plates cooperates with the force-absorbing system through force transmission and the first and second cam plates have different contour characteristics.

13. A force application apparatus for delivering a braking force to a force-absorbing system of a disk brake comprising a force generating device for applying a variable force to the force-absorbing system, a proportioning device having at least two contoured surfaces, at least one contoured surface of the at least two contoured surfaces delivering the varying force applied to the force-absorbing system, and an adjusting device for changing the position of the at least one contoured surface to vary the force delivered to the force-absorbing system wherein the at least two contoured surfaces are constructed such that when the position of the proportioning device is adjusted to increase the force acting on the force-absorbing system, energy is liberated from the force generating device and when the position of the proportioning device is adjusted to decrease the force acting on the force-absorbing system, the force generating device absorbs at least part of the energy released by the force-absorbing system.

14. The force application apparatus according to claim 13, wherein the proportioning device is adapted to pivot about an axis disposed parallel to an axis of the force generating device, such that the at least two contoured surfaces rotate about the parallel axis.

15. The force application apparatus according to claim 14, wherein the proportioning device is adapted to pivot about an axis disposed perpendicular to an axis of the force generating device, such that the at least two contoured surfaces pivot about the perpendicular axis.

16. The force application apparatus according to claim 15, wherein the at least two contoured surfaces are caused to pivot by the adjusting device between an initial position of about 0 degrees and a maximum position of about 90 degrees.

17. The force application apparatus according to claim 13, wherein the at least two contoured surfaces comprise a first and a second cam plate, the first and second cam plates each shaped to have a descending gradient contour.

18. The force application apparatus according to claim 13, wherein the at least two contoured surfaces comprise a first cam plate pair and a second cam plate pair, each cam plate of each cam plate pair extending for an angular segment of about 180 degrees.

19. The force application apparatus according to claim 13, wherein the force generating device comprises a precompressed spring at least partially disposed within a spring housing and wherein the spring housing cooperates with the proportioning device and lever to deliver the varying force applied to the force-absorbing system.

20. The force application apparatus according to claim 13, further comprising a force delivery mechanism cooperating with the at least one contoured surface of the at least two contoured surfaces for delivering the varying force applied to the force-absorbing system.

21. The force application apparatus according to claim 13, wherein the at least two contoured surfaces comprise a first and a second cam plate, each cam plate having a parabolic contoured surface.

22. The force application apparatus according to claim 13, wherein the proportioning device and adjusting device are constructed as a translational device.

23. The force application apparatus according to claim 13, wherein the at least two contoured surfaces of the proportioning device comprise a first contour for liberation of energy from the force generating device and a second contour for absorption of energy by the force-absorbing system such that, during an increase of the force acting on the force-absorbing system, the magnitude of the energy liberated by the force generating device is equal to the magnitude of the energy absorbed by the force-absorbing system, the signs of the energy contents liberated by the force generating device and absorbed by the force-absorbing system being opposite.

24. A force application apparatus for delivering a braking force to a force-absorbing system of a disk brake comprising a force generating device for applying a variable force to the force-absorbing system, a proportioning device having at least two contoured surfaces, at least one contoured surface of the at least two contoured surfaces delivering the varying force applied to the force-absorbing system, and an adjusting device for changing the position of the at least one contoured surface to vary the force delivered to the force-absorbing system wherein the at least two contoured surfaces include a first and a second cam plate, each cam plate having a parabolic contoured surface, the first and the second cam plates being constructed as a unitary sliding block disposed between the lever and the force generating device, such that when the position of the proportioning device is adjusted to increase the force acting on the force-absorbing system, energy is liberated from the force generating device and when the position of the proportioning device is adjusted to decrease the force acting on the force-absorbing system, the force generating device absorbs at least part of the energy released by the force-absorbing system.

25. An apparatus for applying a braking force to a disk brake of a vehicle's braking system including a force-absorbing system, the apparatus comprising a force generating device including a compressed spring for delivering an actuating force for braking the disk brake, a proportioning device having at least two cam plates each cam plate having a contoured surface, a force delivery mechanism cooperating with at least one cam plate of the at least two cam plates to deliver the actuating force to the force-absorbing system, and an adjusting device for changing the position of the at least one cam plate with respect to the force delivery mechanism to vary the actuating force delivered to the force-absorbing system wherein the contoured surfaces of the at least two cam plates are constructed such that when the position of the proportioning device is adjusted to increase the force acting on the force-absorbing system, energy is liberated from the force generating device and when the position of the proportioning device is adjusted to decrease the force acting on the force-absorbing system, the force generating device absorbs at least part of the energy released by the force-absorbing system.

26. The force application apparatus according to claim 25, wherein the force generating device comprises one of a hydraulic device and a mechanical device.

27. The force application apparatus according to claim 26, wherein the adjusting device changes position in response to a braking command by a driver.

28. The force application apparatus according to claim 27, wherein the varying force delivered to the force-absorbing system corresponds to the braking command of the driver.

29. The force application apparatus according to claim 25 wherein the force delivery mechanism comprises a pivotally coupled lever.

30. An apparatus for applying a braking force to a disk brake of a vehicle braking system including a force-absorbing system, comprising a force generating device including a compressed spring for delivering an actuating force for braking a disk brake, a proportioning device having at least two cam plates, said at least two cam plates being rigidly coupled together and disposed as a one-piece component between said force-generating device and the force-absorbing system each of said at least two cam plates having a contoured surface, a force delivery mechanism cooperating with at least one of said at least two cam plates to deliver actuating force to said force-absorbing system, and an adjusting device for changing the position of said at least one of said at least two cam plates with respect to said force delivery mechanism to vary actuating force delivered to said force-absorbing system, wherein said contoured surfaces of said at least two cam plates are constructed such that when the position of said proportioning device is adjusted to increase force acting on said force-absorbing system, energy is liberated from said force generating device, and when the position of said proportioning device is adjusted to decrease force acting on said force-absorbing system, said force generating device absorbs at least part of energy released by said force-absorbing system.

* * * * *